United States Patent
Kuo

(10) Patent No.: US 8,941,822 B2
(45) Date of Patent: Jan. 27, 2015

(54) CLAMPING DEVICE AND METHOD FOR MEASURING ECCENTRICITY OF OPTICAL-ELECTRIC COUPLING MEMBER

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 90 days.

(21) Appl. No.: 13/759,046

(22) Filed: Feb. 5, 2013

(65) Prior Publication Data

US 2014/0204369 A1 Jul. 24, 2014

(30) Foreign Application Priority Data

Jan. 21, 2013 (TW) .................................. 102102149

(51) Int. Cl.
*G01N 21/01* (2006.01)
*F16B 2/12* (2006.01)

(52) U.S. Cl.
CPC ....................................... *F16B 2/12* (2013.01)
USPC ......................................... 356/127; 403/373

(58) Field of Classification Search
USPC .................. 356/124–127; 403/373
See application file for complete search history.

(56) References Cited

U.S. PATENT DOCUMENTS

| | | | |
|---|---|---|---|
| 5,017,038 A * | 5/1991 | Kurosaki | 403/385 |
| 2009/0168204 A1 * | 7/2009 | Nishizawa et al. | 359/796 |
| 2014/0093204 A1 * | 4/2014 | Kuo | 385/33 |
| 2014/0134288 A1 * | 5/2014 | Kuo | 425/588 |
| 2014/0153871 A1 * | 6/2014 | Kuo | 385/33 |
| 2014/0199024 A1 * | 7/2014 | Kuo | 385/33 |

* cited by examiner

*Primary Examiner* — Hoa Pham
(74) *Attorney, Agent, or Firm* — Novak Druce Connolly Bove + Quigg LLP

(57) ABSTRACT

A clamping device includes a first plate and a second plate. The first plate includes an upper surface, a lower surface facing away from the upper surface and a first side surface. The upper surface is substantially parallel with the lower surface. The first side surface perpendicularly connects the upper surface and the lower surface. The first plate defines a receiving cavity at a joint of the upper surface and the first side surface. The second plate is detachably connected to the first plate. The second plate includes a top surface and a second side surface. The second side surface perpendicularly connects to the top surface. The second plate defines a sloped surface extending from the top surface to the second side surface. The sloped surface aligns with the receiving cavity. The second plate includes a reflective layer positioned on the sloped surface.

11 Claims, 6 Drawing Sheets

CLAMPING DEVICE AND METHOD FOR MEASURING ECCENTRICITY OF OPTICAL-ELECTRIC COUPLING MEMBER

BACKGROUND

1. Technical Field

The present disclosure relates to clamping devices, and particularly to a clamping device and a method for measuring an eccentricity of an optical-electric coupling member.

2. Description of Related Art

An optical-electric coupling member typically includes a main body, two groups of coupling lenses and a sloped surface formed on the main body. The main body includes a first side surface and a second side surface perpendicular to the first side surface. The two groups of coupling lenses are each formed on the first side surface and the second side surface. Precise alignment of the lenses is very important, thus eccentricity measuring of the two groups of coupling lenses is required. However, an eccentricity measuring method is usually first measuring one group of coupling lenses formed on the first side surface, and then measuring the other group of coupling lenses formed on the second side surface, this is time-consuming and laborious.

Therefore, it is desirable to provide a clamping device and a method for measuring an eccentricity of an optical-electric coupling member which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
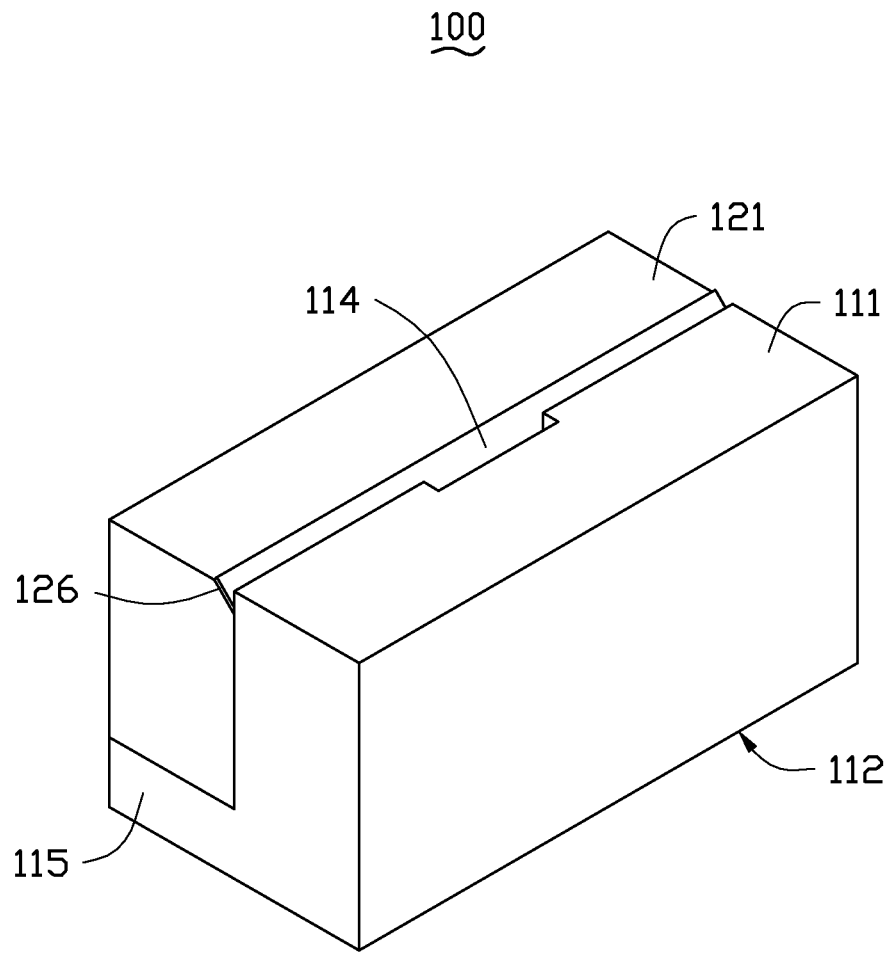
FIG. 1 is an assembled, isometric view of a clamping device according to an exemplary embodiment.
Figure 2:
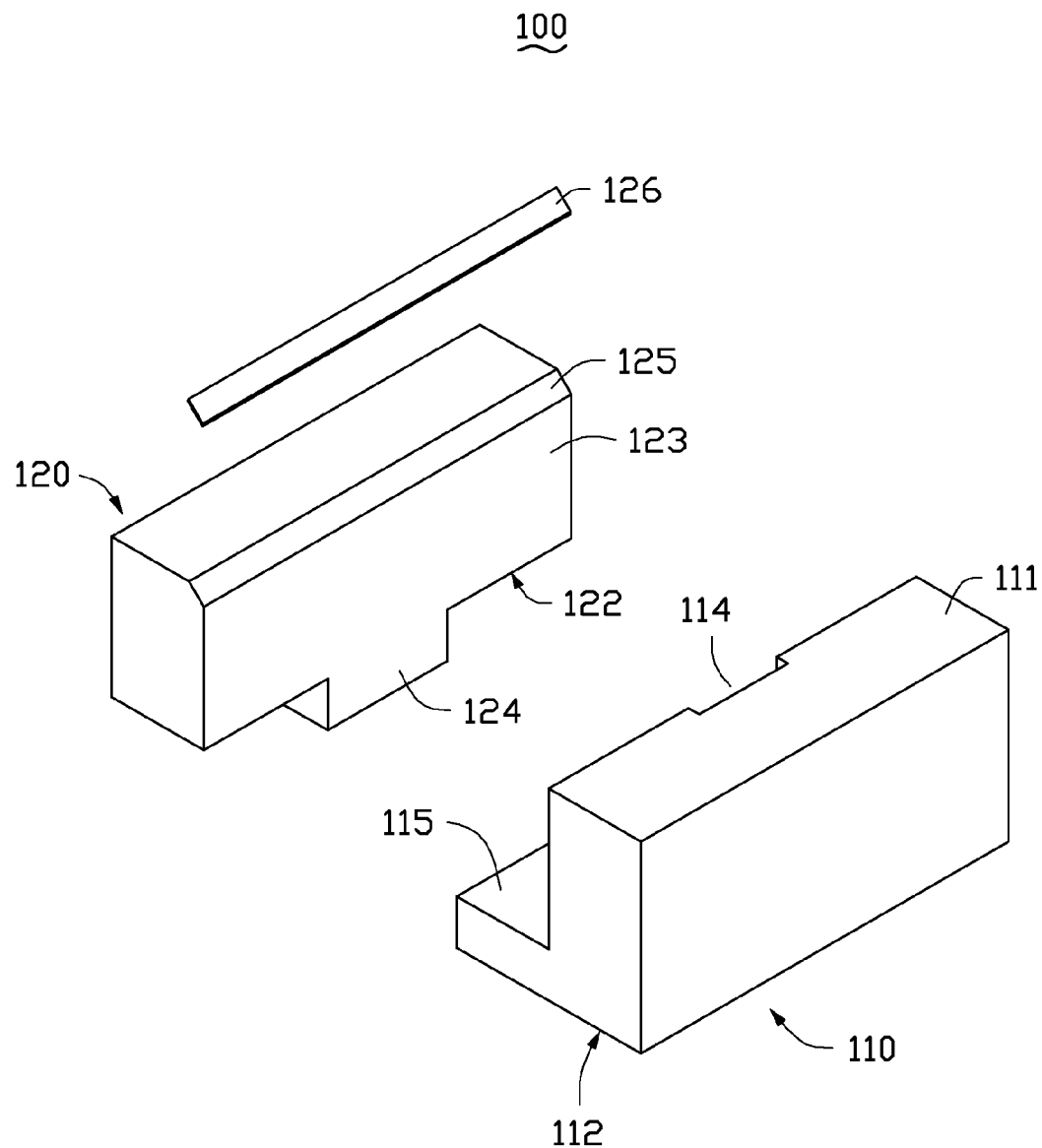
FIG. 2 is an exploded, isometric view of the clamping device of FIG. 1.
Figure 3:
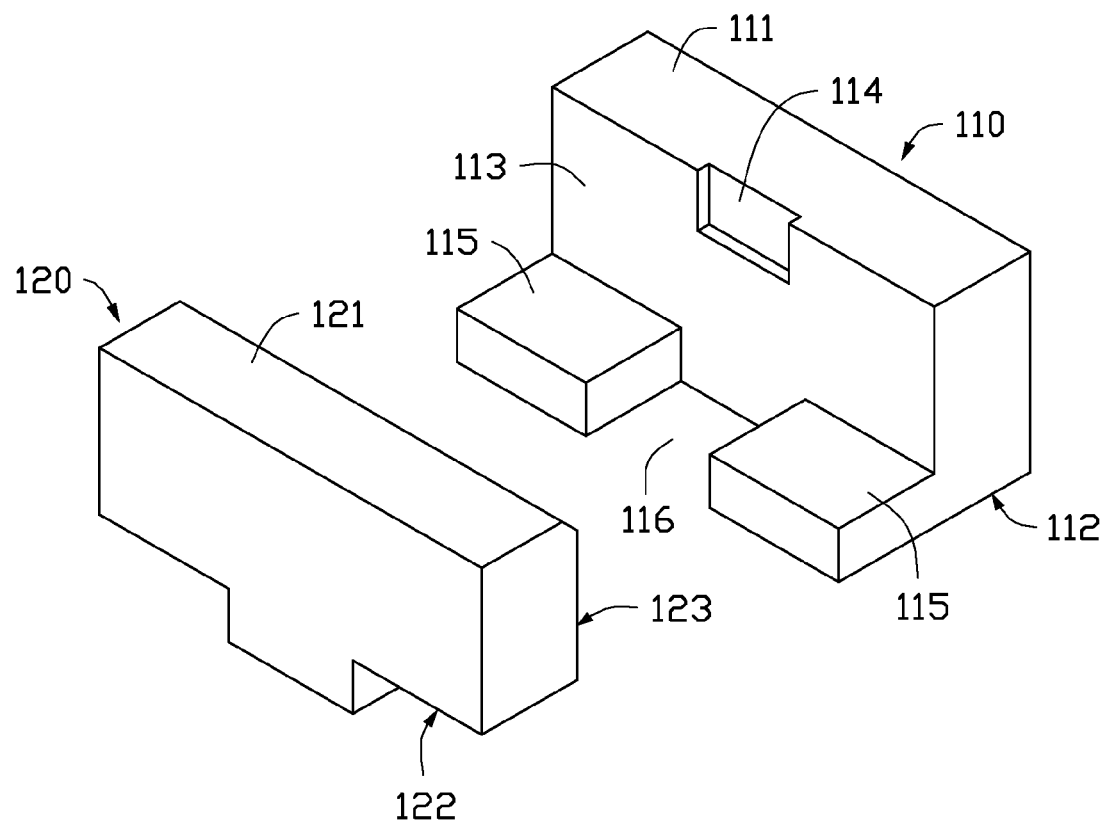
FIG. 3 is similar to FIG. 2, but viewed from another angle.
Figure 4:
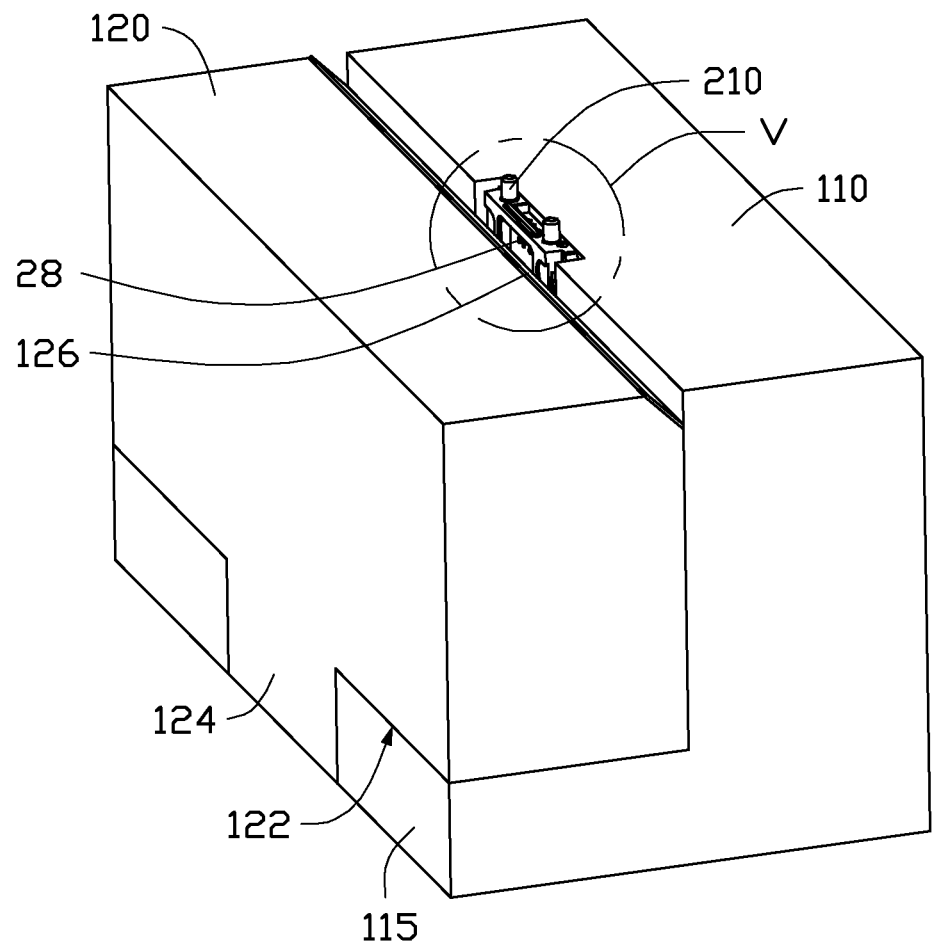
FIG. 4 is assembled, isometric view of the clamping device of FIG. 3 together with an optical-electric coupling member, according to an exemplary embodiment.
Figure 5:
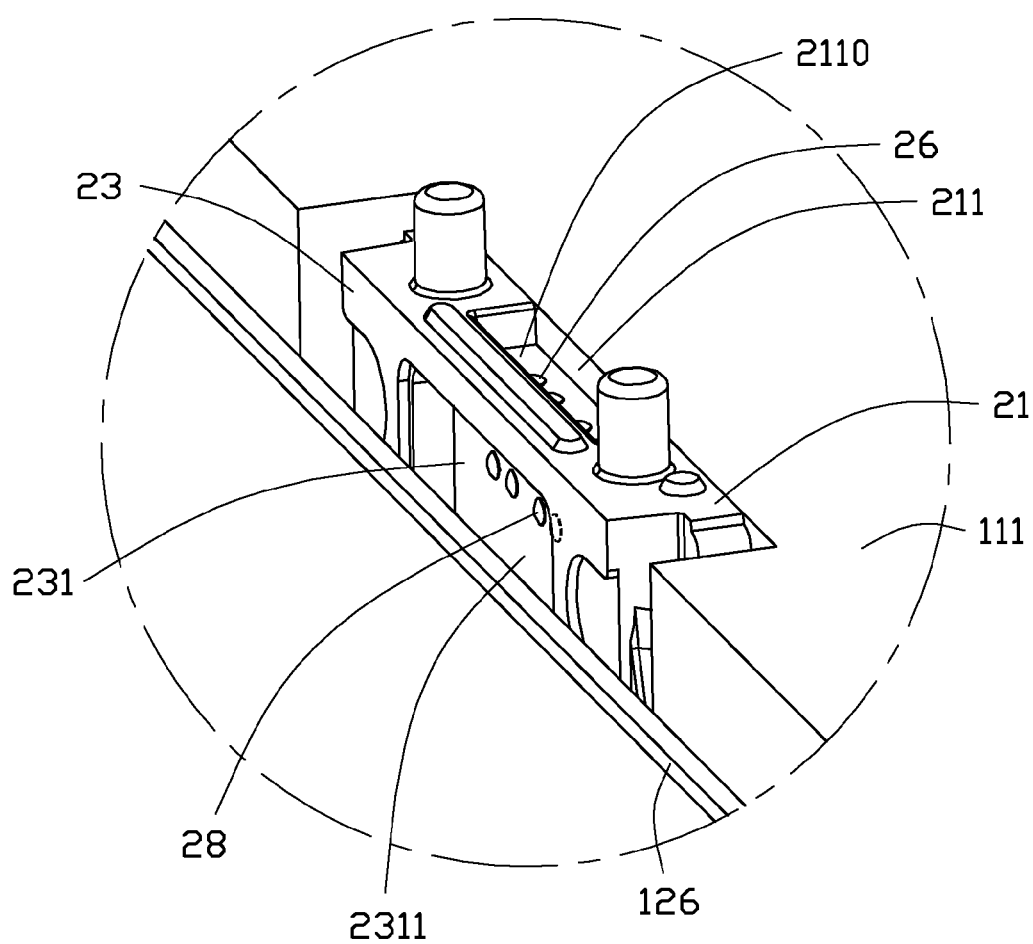
FIG. 5 is an enlarged view of a circled portion V of FIG. 4.

FIGS. 1-5 show a clamping device 100, according to an embodiment, which is used to clamp an optical-electric coupling member 200, when measuring an eccentricity or degree of misalignment of the optical-electric coupling member 200. The optical-electric coupling member 200 includes a first surface 21 and a second surface 23 (see FIG. 5). The first surface 21 is substantially perpendicular to the second surface 23. Two positioning poles 210 perpendicularly extend upwards from the first surface 21. The optical-electric coupling member 200 defines a receiving cavity 211 in the first surface 21. The receiving cavity 211 includes a bottom surface 2110. The bottom surface 2110 forms four first coupling lenses 26. The optical-electric coupling member 200 defines a second cavity 231 in the second surface 23. A bottom portion 2311 of the second cavity 231 forms four second coupling lenses 28.

The clamping device 100 is substantially rectangular and includes a first plate 110 and a second plate 120.

The first plate 110 includes an upper surface 111, a lower surface 112 facing away from the upper surface 111, and a first side surface 113. The upper surface 111 is substantially parallel with the lower surface 112. The first side surface 113 perpendicularly connects the upper surface 111 with the lower surface 112. The first plate 110 defines a receiving cavity 114 at a joint of the upper surface 111 and the first side surface 113 extending toward the lower surface 112. The receiving cavity 114 is configured to receive the optical-electric coupling member 200.

Two locating blocks 115 perpendicularly extend outward from the first side surface 113. The two locating blocks 115 are distanced, such that a locating opening 116 is formed between the two locating blocks 115. In the embodiment, the two locating blocks 115 are symmetrical about the locating opening 116. The two locating blocks 115 are integrally formed with the first plate 110. Alternatively, the two locating blocks 115 and the first plate 110 can be separately formed. The two locating blocks 115 can be attached to the first side surface 113 by adhesive, by plastic welding, or by other attaching methods.

The second plate 120 includes a top surface 121, a bottom surface 122 facing away from the top surface 121, and a second side surface 123. The top surface 121 is substantially parallel with the bottom surface 122. The second side surface 113 perpendicularly connects the top surface 121 with the bottom surface 122. A locating flange 124 perpendicularly extends downward from the bottom surface 112. The shape and size of the locating flange 124 are respectively corresponds to the shape and size of the locating opening 116 of the first plate 110. When assembling, the locating flange 124 is inserted into the locating opening 116 as a very close or pinch fit to firmly attach the first plate 110 with the second plate 120, with the bottom surface 122 of the second plate 120 resisting against the locating blocks 115. When disassembling, the locating flange 124 is detached from the locating opening 116 by pulling the second plate 120 away from the first plate 110 or by pulling the first plate 110 along a direction away from the second plate 120.

The second plate 120 defines a sloped surface 125 extending from the top surface 121 to the second side surface 123. The top surface 121 and the sloped surface 125 define an angle therebetween. In the embodiment, the angle is about 45 degrees. The sloped surface 125 aligns with the receiving cavity 114. A reflective layer 126 is coated or arranged on the sloped surface 125. The reflective layer 126 is made of stainless steel. Alternatively, the reflective layer 126 also can be a mirror.

Figure 6:
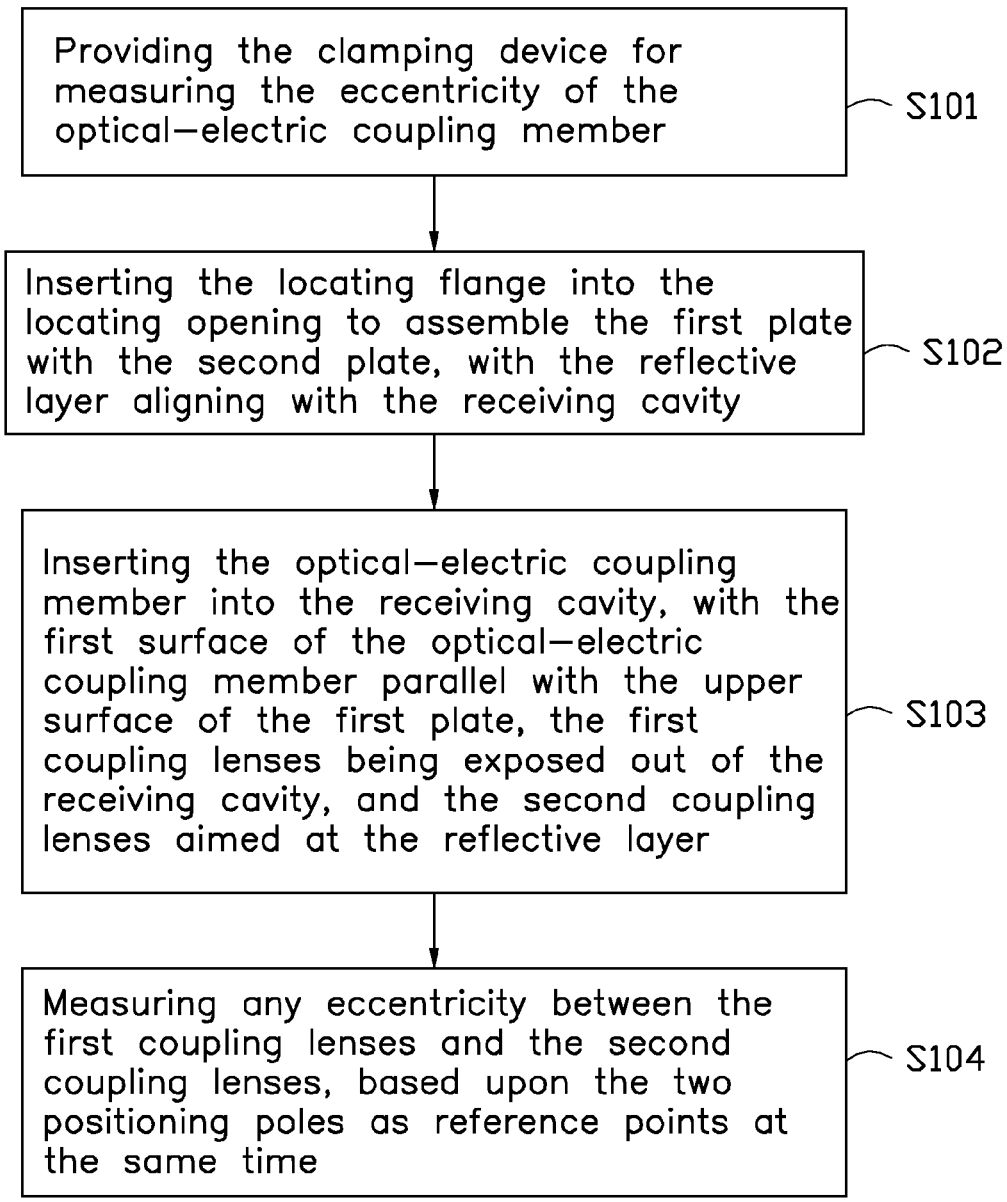
FIG. 6 is a flowchart of a method for measuring an eccentricity of the optical-electric coupling member of FIG. 4, according to an exemplary embodiment.

FIG. 6 shows a method for measuring any eccentricity of the optical-electric coupling member 200, according to an embodiment. The method includes steps described as follows.

In step S101, providing the clamping device 100 for measuring the eccentricity of the optical-electric coupling member 200.

In step S102, inserting the locating flange 124 into the locating opening 116 to assemble the first plate 110 with the second plate 120, with the reflective layer 126 aligning with the receiving cavity 114.

In step S103, inserting the optical-electric coupling member 200 into the receiving cavity 114, with the first surface 21 of the optical-electric coupling member 200 parallel with the upper surface 111 of the first plate 110, the first coupling lenses 26 being exposed out of the receiving cavity 114, and the second coupling lenses 28 aimed at the reflective layer 126.

In step S104, measuring any eccentricity between the first coupling lenses 26 and the second coupling lenses 28, based upon the two positioning poles 210 as reference points at the same time. In the embodiment, a camera module (not shown) captures an image of the first coupling lenses 26 and the second coupling lenses 28 aimed at the reflective layer 126, then measuring any eccentricity between the first coupling lenses 26 and the second coupling lenses 28 aimed at the reflective layer 126, based upon the two positioning poles 210 as reference points at the same time.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A clamping device comprising:
a first plate comprising an upper surface, a lower surface facing away from the upper surface and a first side surface, the upper surface substantially parallel with the lower surface, the first side surface perpendicularly connecting the upper surface and the lower surface, the first plate defining a receiving cavity at a joint of the upper surface and the first side surface; and
a second plate detachably connected to the first plate, the second plate comprising a top surface and a second side surface, the second side surface perpendicularly connecting to the top surface, the second plate defining a sloped surface extending from the top surface to the second side surface, the second plate further comprising a reflective layer arranged on the sloped surface, wherein when the first plate is engaged with the second plate, the first side surface touches the second side surface and the sloped surface is aligning with the receiving cavity.

2. The clamping device of claim 1, wherein the first plate comprises two locating blocks perpendicularly extending outward from the first side surface, the two locating blocks are distanced from each other, with a locating opening defined between the two locating blocks, the second plate comprises a bottom surface facing away from the top surface, the top surface is substantially parallel with the bottom surface, the second plate comprises a locating flange perpendicularly extending downward from the bottom surface, the shape and size of the locating flange are respectively corresponds to the shape and size of the locating opening of the first plate.

3. The clamping device of claim 2, wherein the two locating blocks are symmetrical about the locating opening.

4. The clamping device of claim 2, wherein when assembling, the locating flange is inserted into the locating opening as a pinch fit to firmly attach the first plate with the second plate, with the bottom surface of the second plate resisting against the locating blocks.

5. The clamping device of claim 2, wherein when disassembling, the locating flange is detached from the locating opening by pulling the second plate or by pulling the first plate along a direction away from the second plate.

6. The clamping device of claim 2, wherein the two locating blocks are integrally formed with the first plate.

7. The clamping device of claim 1, wherein the top surface and the sloped surface form an angle therebetween.

8. The clamping device of claim 7, wherein the angle is about 45 degrees.

9. The clamping device of claim 1, wherein the reflective layer is made of stainless steel.

10. The clamping device of claim 1, wherein the reflective layer is a mirror.

11. A method for measuring an eccentricity of an optical-electric coupling member, the optical-electric coupling member comprising a first surface and a second surface substantially perpendicular to the first surface, the optical-electric coupling member also comprising two positioning poles perpendicularly extending upward from the first surface, a plurality first coupling lenses forming on the first surface, and a plurality of second coupling lenses forming on the second surface, the method comprising:
providing a clamping device, the clamping device comprising a first plate and a second plate, the first plate comprising an upper surface, a lower surface facing away from the upper surface and a first side surface, the upper surface substantially parallel with the lower surface, the first side surface perpendicularly connecting the upper surface and the lower surface, the first plate defining a receiving cavity at a joint of the upper surface and the first side surface, the second plate detachably connected to the first plate, the second plate comprising a top surface and a second side surface, the second side surface perpendicularly connecting to the top surface, the second plate defining a sloped surface extending from the top surface to the second side surface, the second plate further comprising a reflective layer arranged on the sloped surface;
assembling the first plate with the second plate, with the reflective layer aligning with the receiving cavity;
inserting the optical-electric coupling member into the receiving cavity, with the first surface of the optical-electric coupling member parallel with the upper surface of the first plate, the first coupling lenses exposed out of the receiving cavity, and the second coupling lenses aimed at the reflective layer; and
measuring any eccentricity between the first coupling lenses and the second coupling lenses aimed at the reflective layer, based upon the two positioning poles as reference points at the same time.

* * * * *